(12) United States Patent
Miga et al.

(10) Patent No.: US 8,015,635 B1
(45) Date of Patent: Sep. 13, 2011

(54) STRUCTURAL BUNK SYSTEM

(75) Inventors: Michael Miga, Portland, OR (US);
Graham Wildey, Portland, OR (US)

(73) Assignee: Consolidated Metco, Inc., Vancouver, WA (US)

( * ) Notice: Subject to any disclaimer, the term of this patent is extended or adjusted under 35 U.S.C. 154(b) by 0 days.

(21) Appl. No.: 12/924,200

(22) Filed: Sep. 23, 2010

(51) Int. Cl.
*A47D 7/00* (2006.01)

(52) U.S. Cl. ............................................. 5/118; 5/2; 5/8

(58) Field of Classification Search .................... 5/9.1, 8, 5/2, 118
See application file for complete search history.

(56) References Cited

U.S. PATENT DOCUMENTS

| 4,084,276 | A | 4/1978 | Trexler, Jr. et al. |
| 5,432,963 | A | 7/1995 | Coral et al. |
| 6,859,966 | B2 * | 3/2005 | Helmsderfer ..................... 5/655 |
| 6,911,407 | B2 * | 6/2005 | Sherrod et al. .................. 442/76 |
| 7,104,593 | B2 | 9/2006 | Hungerford et al. |
| 7,543,340 | B2 | 6/2009 | Kenny et al. |

* cited by examiner

*Primary Examiner* — Fredrick Conley
(74) *Attorney, Agent, or Firm* — Edward J. Brosius

(57) ABSTRACT

A structural bunk system for a sleeper cab or other confined space is provided. The bunk system includes first and second shells that are made by injection molding and are then bonded together. The structural bunk system is secured to the wall of the sleeper cab or other confined space and is adapted to be moved between and upright stowed position and a lowered sleeping or storage position.

3 Claims, 1 Drawing Sheet

STRUCTURAL BUNK SYSTEM

BACKGROUND OF THE INVENTION

The present invention relates to a structural bunk system for vehicles and, more particularly, to a molded bunk substrate used in an upper bunk application in a vehicle.

Many vehicles, such as large over-the-road trucks, or long-haul tractor-trailers, include a sleeping compartment or other area in which one or more bunks may be placed so that the drivers have a place to sleep or relax during breaks in driving. Traditional construction methods for current bunk systems include metal structures with honeycomb, plywood or cot-like materials.

Current bunk systems having rigid sleeping surfaces are typically very hard and uncomfortable to sleep on or require large cushions or mattresses that take up storage space and add to the weight and cost of the bunk system. Moreover, current bunk systems for vehicle use require multiple pieces that must be mechanically attached using numerous fasteners or twin-sheet thermoformed urethane foam-filled bunks with integral metal structures.

A need still exists for a bunk arrangement, particularly an upper bunk, that can be compactly and conveniently stored within the vehicle so as to provide extended storage place, as well as a convenient and comfortable sleeping surface.

SUMMARY OF THE INVENTION

An object of the present invention is to provide a structural bunk system, particularly an upper bunk, for supporting dynamic and static loads of an occupant in a vehicle application.

Another object of the present invention is to provide a comfortable supportive bunk system for vehicles that is both light weight and low cost.

Yet another object of the present invention is to provide a structural bunk system that offers unique advantages over current bunk systems.

The present invention provides a simple method of constructing a structural bunk system that permits both the top and bottom sides of the bunk to be visually acceptable. In addition to improved aesthetic properties, the present invention requires fewer components, is lighter in weight, and is less expensive than currently-used bunk systems.

BRIEF DESCRIPTION OF THE DRAWINGS

The invention will be described with reference to the following drawings, wherein.

DETAILED DESCRIPTION OF THE PREFERRED EMBODIMENTS

The present invention relates to a structural bunk system. More specifically, the present invention relates to a molded bunk substrate for use in a bunk, preferably an upper bunk, application. The substrate includes two injection-molded shells that are bonded together to form a structural bunk system that can be folded into an upright stowed position and lowered into a sleeping or storage position.

The structural bunk system according to the present invention provides adequate support for the static and dynamic loads of an occupant, particularly in a commercial vehicle application. Unlike current bunk systems for commercial vehicles and the like, the present invention incorporates two injection-molded panels bonded together to provide the basic structure to support such loads, completed by the necessary mechanical attachments for bunk articulate and mounting.

In accordance with the present invention, the structural bunk system is made from two injection-molded shells that are bonded together. As will be described in more detail, the geometry and the targeted bonded sections of the bunk system of the present invention provide the structure necessary to support the load requirements of the occupant or occupants. It should be noted that the bunk system of the present invention is not limited to use in commercial vehicles such as long-haul trucks but may also be used in boats, campers and other confined places where space for sleeping arrangements is limited.

Figure 1:
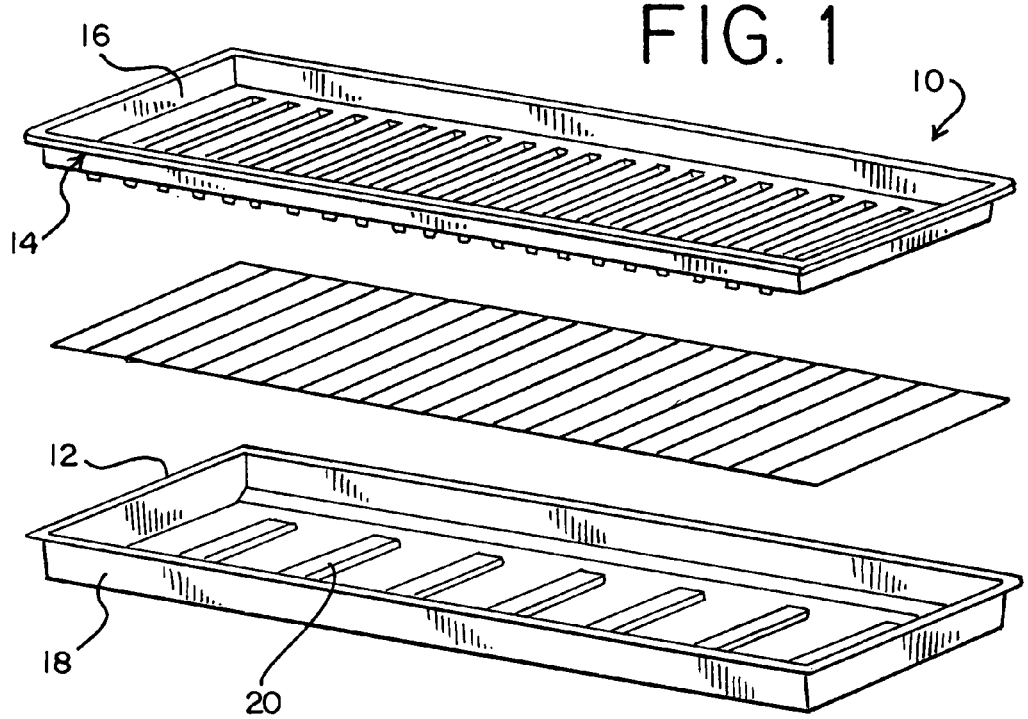
FIG. 1 is an schematic exploded view of the structural bunk system of the present invention.

Referring now to the drawings, FIG. 1 is an exploded view of the structural bunk system of the present invention. As seen therein, the bunk system 10 is made from a first injection-molded shell 12 and a second injection-molded shell 14. First shell 12 is designed to receive second shell 14. Second shell 14 is designed to receive a mattress or a combination of storage devices such as dividers, baskets, tethers and the like.

Shells 12, 14 of the structural bunk system of the present invention may be made of any suitable plastic polymer. Preferred polymers include olefin materials, particularly polypropylene and, more particularly, a filled polypropylene material. Non-limiting examples of suitable filled polypropylene materials include polypropylene filled with glass, mica, talc or calcium carbonate.

Shells 12, 14 are made by injection molding. Injection molding is a manufacturing process for producing parts from both thermoplastic and thermosetting plastic materials. It is one of the most common methods of shaping plastic resins. Injection molding is accomplished by large machines called injection molding machines, which typically consist of a material hopper, an injection ram or screw-type plunger, a heating unit, and a mold.

With injection molding, resin is fed to the machine by gravity from a hopper into a heated barrel. If desired, colorants may be fed to the machine directly after the hopper. Upon entrance into the barrel, the resin is heated to the appropriate melting temperature and is melted. The melted plastic is then injected into the mold by the screw-type plunger or the ram injector. The mold receives the plastic in the mold cavity and shapes it appropriately. The mold is cooled constantly to a temperature that allows the resin to solidify almost as soon as the mold cavity is filled. Once the cavity is filled, the mold plates are held together by hydraulic or mechanical force. This holding pressure is maintained to compensate for material shrinkage. Once the part is sufficiently cool, the mold opens and the part is ejected.

Some advantages of injection molding are high production rates, repeatable high tolerances, the ability to use a wide range of materials, low labor cost, minimal scrap losses, and little need to finish parts after molding. Additionally, injection molding the structural bunk system of the present invention provides more flexibility in the available design features over current manufacturing methods in that various features/fixtures may be molded directly to shells 12, 14. This eliminates the need for manufacturing additional desired features/fixtures, as well the need for attaching such features/fixtures to the structural bunk system.

As shown in FIG. 1, shells 12, 14 are generally rectangular in shape. The shape of the injection-molded shells used in the bunk system of the present invention, however, could be changed or modified if desired. Additionally, the injection-molded shells used in the bunk system of the present invention could be manufactured to suit a variety of bunk dimensions and aesthetic requirements such as, for example, being made larger or wider or with additional features or fixtures attached thereto.

Referring again to FIG. 1, shells 12, 14 respectively include surrounding flanges 16, 18. Flanges 16, 18 completely surround shells 12, 14 on all four sides. Flanges 16, 18 are elevated to capture a mattress from shifting or sliding out during movement or articulation. Flanges 16, 18 are also designed to facilitate additional mounting surfaces for items such as, for example, bunk restraints, stowage latches, and lift assists (not shown). For additional structure, a series of longitudinal welds 20 are added that assist with necessary load requirements.

In accordance with the present invention, shells 12, 14 are bonded together to form structural bunk system 10. Shells 12, 14 may be bonded together by any suitable means; however, the bonding material must be of a similar material as the shells themselves. Preferably, the bonding of shells 12, 14 is done via adhesive bonding or electromagnetic bonding. Electromagnetic bonding and adhesive bonding are preferred because they provide 100% joint integrity, whereas welding only provides about 60-70% joint integrity. Of these two preferred bonding methods the more preferred method is a volume-driven economic question. If it is desired to produce a large volume of the structural bunk system, then the more preferred bonding method is electromagnetic bonding. If, on the other hand, a small volume of the structural bunk system is desired, then the preferred bonding method is adhesive bonding.

Electromagnetic bonding is a joining process that uses high frequency energy coupled with electromagnetic susceptor materials to deliver heat precisely to a bond line to provide welding of virtually all thermoplastic materials. One such non-limiting example of electromagnetic bonding is EMAbond®. EMAbond® generally involves several phases. In the first phase, before joining, an EMAbond preform is placed within the joint. The mating parts are brought together and placed within a fixture containing a work coil that conforms to the weld line geometry. This phase is easily automated or operator initiated. In the next phase, during joining, the activated work coil heats and melts the EMAbond resin causing the adjoining surfaces to melt. Energy is only consumed during the actual heating cycle, which typically is between 1 to 30 seconds. Low clamping force is applied via the specially designed fixture to allow efficient transfer of melt temperature to the substrate. In the final phase, after joining, the EMAbond resin has filled the joint design gap. The process has fused the mating parts, resulting in a permanent polymer to polymer joint.

Adhesive bonding is a joining process used to fasten two surfaces together, usually producing a smooth bond. This joining technique involves glues, epoxies, or various plastic agents that bond by evaporation of a solvent or by curing a bonding agent with heat, pressure, or time. The adhesive is applied to either one or both of the materials being bonded. The pieces are aligned and pressure is added to aid in adhesion and rid the bond of air bubbles. Adhesive bonding provides superior stress-bearing components, distributing stress load evenly over a broad area, thereby reducing stress on the joint. As they are applied inside the joint, adhesives are invisible within the assembly. Adhesives resist flex and vibration stresses and form a seal, as well as a bond.

Figure 2:
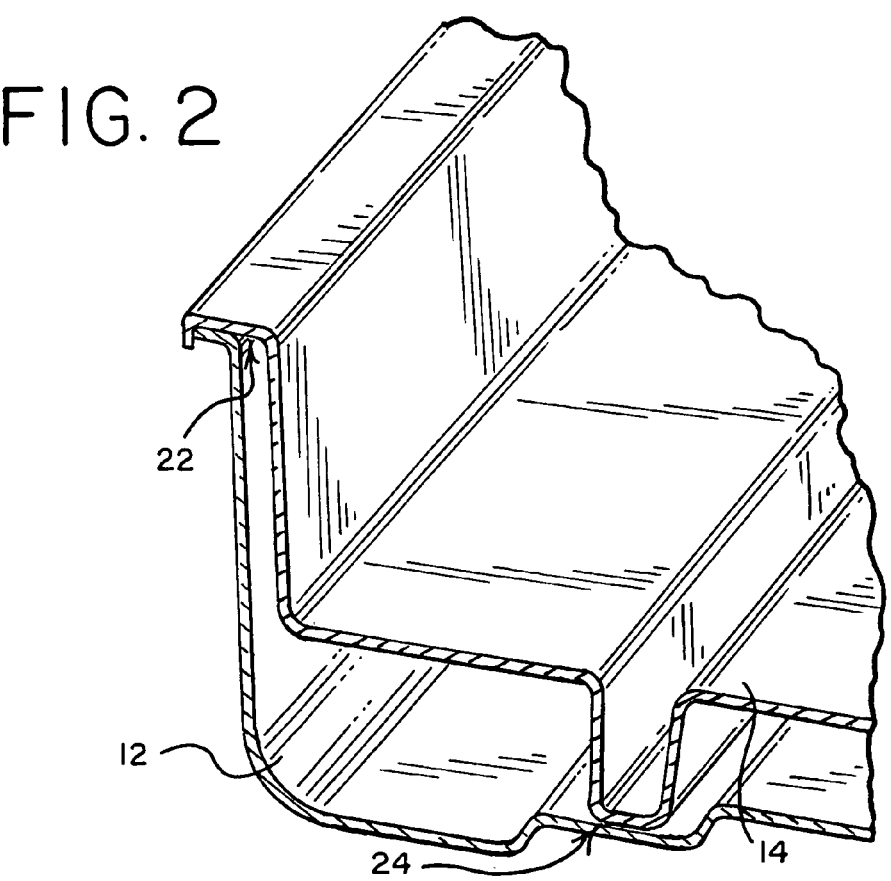
FIG. 2 is a second schematic view showing the bonding joints of the structural bunk system of the present invention.

Once bonded together, injection-molded shells 12, 14 form a composite structure that provides the integrity and aesthetics of the structural bunk system of the present invention. Referring now to FIG. 2, shells 12, 14 are shown therein as bonded together to form to form the one-piece structural bunk system of the present invention. Bonding joints 22, 24 illustrate where the bonding of shells 12, 14 occurs.

Shells 12, 14 provide design flexibility to support the varying load requirements, while maintaining a visual A-side suited to accommodate the component's desired aesthetics. The adhesive bonding and the electromagnetic bonding allow for no visible fasteners and accommodate a non-linear interface pattern, both of which help make the resulting bunk system aesthetically pleasing.

Structural bunk system 10 is secured to the wall of the sleeper cab or other confined space and is adapted to be moved between an upright stowed position and a lowered sleeping or storage position. Mounting means may include any means typically used to pivotably mount such bunk systems to the wall of a cab or other confined spaces. Preferably, hinge brackets (not shown) located in the rear corners of the structural bunk system of the present invention are bolted to the wall to attach the structural bunk system thereto.

As mentioned, the structural bunk system of the present invention is moveable between a lowered horizontal position, which is used for sleeping, storage, etc., and an upright stowed position when the bunk system is not in use. The stowed position may be adjacent to a wall of the cab. A suitable locking device (not shown) is used to secure the bunk system in the upright stowed position. When in the lowered position, the front corners of the structural bunk system rest on L-brackets or similar devices.

The structural bunk system in accordance with the present invention is designed to accommodate a typical in-use occupant load. The geometry that the two bonded shells of the structural bunk system of the present invention bring, along with the material properties of the thermoplastic, provide structural integrity to support the static and dynamic loads of an occupant, particularly in a commercial vehicle application.

The structural bunk system of the present invention can also be used as a storage module. In this embodiment, no mattress is placed within shell 14 of structural bunk system 10. Instead, a combination of storage devices (not shown) such dividers, baskets, tethers and the like may be placed within shell 14 and used to store and hold items in place on structural bunk system 10.

The structural bunk system of the present invention may find application in several types of vehicles. Such vehicles include, but are not limited to, commercial vehicles like large over-the-road trucks, other heavy trucks, recreation vehicles and marine OEMs.

The benefits and advantages of the structural bunk system of the present invention are many. The present invention provides a structural bunk system that is simpler than current systems. The structural bunk system contains fewer components, as the injection molding process provides for molded-in features/fixtures, thereby negating the need for attaching additional parts. The structural bunk system of the present invention has better cosmetics and is also more aesthetically pleasing than traditional bunk systems. Additionally, the structural bunk system of the present invention is more competitive because of lower manufacturing costs and the lower weight of the finished system itself. Furthermore, although lighter in weight than traditional bunk systems, the structural bunk system of the present invention is stronger than current bunk systems.

According to the present invention, the method of construction and the choice of manufacturing process allow for simple construction and for all sides of the structural bunk system to be visually acceptable. In conjunction with the improved aesthetic qualities, the structural bunk system of the present invention requires fewer components, has lower part weight and lower parts costs.

What is claimed is:

1. A structural bunk system comprising a first injection molded shell and a second injection molded shell,
   wherein the second injection molded shell includes a plurality of ribs extending downwardly from a bottom surface of the second injection molded shell, and
   wherein the second injection molded shell includes a flange edge extending around the second injection molded shell, and
   wherein the first injection molded shell includes a flange edge extending around the first injection molded shell and an inner surface, and
   the first injection molded shell is bonded to the second injection molded shell along an interface between a rib of the second injection molded shell and
   the inner surface of the first injection molded shell and along an interface between the flange edge of the first injection molded shell and
   the flange of the second injection molded shell.

2. The structural bunk system of claim 1, wherein the bonding method is electromagnetic bonding.

3. The structural bunk system of claim 1, wherein the bonding method is adhesive bonding.

* * * * *